(12) United States Patent
Wang et al.

(10) Patent No.: US 10,419,743 B2
(45) Date of Patent: Sep. 17, 2019

(54) THREE-DIMENSIONAL DISPLAY APPARATUS AND THREE-DIMENSIONAL DISPLAY METHOD

(71) Applicants: BOE Technology Group Co., Ltd., Beijing (CN); Hefei Xinsheng Optoelectronics Technology Co., Ltd., Hefei, Anhui Province (CN)

(72) Inventors: Huan Wang, Beijing (CN); Mookeun Shin, Beijing (CN)

(73) Assignees: BOE Technology Group Co., Ltd., Beijing (CN); Hefei Xinsheng Optoelectronics Technology Co., Ltd., Anhui (CN)

( * ) Notice: Subject to any disclaimer, the term of this patent is extended or adjusted under 35 U.S.C. 154(b) by 438 days.

(21) Appl. No.: 14/608,846

(22) Filed: Jan. 29, 2015

(65) Prior Publication Data
US 2016/0173860 A1 Jun. 16, 2016

(30) Foreign Application Priority Data

Dec. 11, 2014 (CN) .......................... 2014 1 0765843

(51) Int. Cl.
| | |
|---|---|
| *H04N 13/383* | (2018.01) |
| *H04N 13/315* | (2018.01) |
| *H04N 13/324* | (2018.01) |
| *H04N 13/31* | (2018.01) |
| *G02B 5/20* | (2006.01) |
| *G02B 27/22* | (2018.01) |

(52) U.S. Cl.
CPC ............. *H04N 13/31* (2018.05); *G02B 5/201* (2013.01); *G02B 27/2214* (2013.01); *H04N 13/315* (2018.05); *H04N 13/324* (2018.05); *H04N 13/383* (2018.05)

(58) Field of Classification Search
CPC ...................................................... H04N 13/31
See application file for complete search history.

(56) References Cited

U.S. PATENT DOCUMENTS

| | | | | |
|---|---|---|---|---|
| 5,751,384 A | * | 5/1998 | Sharp .................... | G02B 27/288 348/E5.133 |
| 5,963,371 A | * | 10/1999 | Needham ............ | G02B 27/2264 359/464 |
| 6,163,336 A | * | 12/2000 | Richards ............ | G02B 27/0093 348/42 |

(Continued)

*Primary Examiner* — Chanh D Nguyen
*Assistant Examiner* — Karin Kiyabu
(74) *Attorney, Agent, or Firm* — Banner & Witcoff, Ltd.

(57) ABSTRACT

Embodiments of the present invention provide a three-dimensional display apparatus and a three-dimensional display method, the three-dimensional display apparatus comprising: a display device, including a plurality of pixels arranged in an array and being capable of emitting light of first and second spectrum groups; a parallax barrier, including a plurality of first and second narrow band filters arranged alternately, wherein the plurality of first narrow band filters are pervious to the light of the first spectrum group but block the light of the second spectrum group, and the plurality of second narrow band filters are pervious to the light of the second spectrum group but block the light of the first spectrum group, the first and second spectrum groups not overlapping each other. Thus, the three-dimensional display apparatus and method can increase the number of viewing points and enhance freedom degree of stereoscopic viewing.

19 Claims, 11 Drawing Sheets

(56) References Cited

U.S. PATENT DOCUMENTS

| | | | | |
|---|---|---|---|---|
| 6,252,707 B1* | 6/2001 | Kleinberger | H04N 13/337 | 359/465 |
| 6,999,110 B2* | 2/2006 | Kobayashi | G02B 27/2214 | 348/51 |
| 7,813,042 B2* | 10/2010 | Mather | G02B 27/10 | 345/33 |
| 7,832,869 B2* | 11/2010 | Maximus | G02B 26/007 | 348/60 |
| 8,556,429 B2* | 10/2013 | Husak | G03B 33/00 | 353/7 |
| 2002/0154215 A1* | 10/2002 | Schechterman | A61B 1/00193 | 348/51 |
| 2007/0127121 A1* | 6/2007 | Maximus | G02B 26/007 | 359/465 |
| 2007/0165305 A1* | 7/2007 | Mehrle | G02B 27/2214 | 359/464 |
| 2008/0002255 A1* | 1/2008 | Tavor | G02B 27/2214 | 359/464 |
| 2008/0068329 A1* | 3/2008 | Shestak | H04N 13/0404 | 345/102 |
| 2011/0122467 A1* | 5/2011 | Futterer | G02F 1/133524 | 359/9 |
| 2012/0133648 A1* | 5/2012 | Hirakata | G09G 3/342 | 345/419 |
| 2012/0206574 A1* | 8/2012 | Shikata | H04N 13/0497 | 348/46 |
| 2013/0169518 A1* | 7/2013 | Wu | G02B 27/2214 | 345/88 |
| 2013/0182322 A1* | 7/2013 | Silverstein | G02C 7/107 | 359/464 |
| 2014/0028697 A1* | 1/2014 | Kurtz | G01J 3/465 | 345/589 |
| 2014/0139652 A1* | 5/2014 | Aiden | H04N 13/32 | 348/54 |
| 2014/0320614 A1* | 10/2014 | Gaudreau | G02B 27/2214 | 348/51 |
| 2015/0103401 A1* | 4/2015 | Park | G02B 21/34 | 359/363 |
| 2015/0271481 A1* | 9/2015 | Guthrie | G09G 3/2003 | 382/154 |
| 2015/0281535 A1* | 10/2015 | Korenaga | G01N 33/025 | 348/360 |
| 2016/0077252 A1* | 3/2016 | Zhang | G02B 5/201 | 349/42 |
| 2016/0212414 A1* | 7/2016 | Chen | G02B 5/201 | |
| 2017/0023708 A1* | 1/2017 | Zhou | G02B 3/0056 | |

* cited by examiner

THREE-DIMENSIONAL DISPLAY APPARATUS AND THREE-DIMENSIONAL DISPLAY METHOD

This application claims priority to Chinese Patent Application No. CN 201410765843.0 filed on Dec. 11, 2014. The present application claims priority to and the benefit of the above-identified application and is incorporated herein in its entirety.

TECHNICAL FIELD

Embodiments of the present invention relate to a three-dimensional display apparatus and a three-dimensional display method.

BACKGROUND

In recent years, three-dimensional display technology are paid more and more attention, and the basic principle thereof is to enable a person's left and right eyes to respectively receive different pictures, and then the brain superimposes and regenerates image information so as to implement a three-dimensional effect.

The three-dimensional display technology is mainly divided into two implementation modes: a naked-eye type and a glass type, wherein, the glass-type three-dimensional display technology needs a special glasses to be worn, which is inconvenient to carry, so the naked-eye three-dimensional display technology is more advantageous. Currently, the naked-eye three-dimensional display is mainly implemented in two modes: a parallax barrier and a lenticular lens, wherein the parallax barrier naked-eye three-dimensional display is a main naked-eye three-dimensional display technology.

Generally, in a parallax barrier naked-eye three-dimensional display system, a slit grating is disposed in front of a display device, as shown in FIG. 1, in a 3D display mode, left-eye image information and right-eye image information are selectively separated by the slit grating, i.e., the left eye of a viewer can only see pixels displaying the left-eye image information, while the right eye of the viewer is blocked and cannot see the pixels displaying the left-eye image information, and vice versa. Thus, the left eye of the viewer sees only the left-eye image displayed on a display screen, while the right eye sees only the right-eye image displayed on the display screen, so that the viewer will receive a stereoscopic image pair with parallax to produce the 3D effect.

However, for the existing parallax barrier naked-eye three-dimensional display device, once parameters of the slit grating are determined, a number of viewing points of the three-dimensional stereoscopic display will be determined, so that when the viewer moves horizontally at a certain viewing distance, it will be more probable to view a pseudo stereoscopic image or a pseudoscopic image which has an anteroposterior positional relationship opposite to that of objects in a normal stereoscopic image, which thereby greatly reduces freedom degree of stereoscopic viewing.

SUMMARY OF THE PRESENT INVENTION

The embodiments of the present invention provides a three-dimensional display apparatus and a three-dimensional display method, which can increase the number of viewing points of three-dimensional stereoscopic display, so as to enhance freedom degree of stereoscopic viewing.

An embodiment of the present invention provides a three-dimensional display apparatus, comprising: a display device, including a plurality of pixels arranged in an array and being capable of emitting light of a first spectrum group and light of a second spectrum group; a parallax barrier, including a plurality of first narrow band filters and a plurality of second narrow band filters arranged alternately, wherein the plurality of first narrow band filters are pervious to the light of the first spectrum group but block the light of the second spectrum group, and the plurality of second narrow band filters are pervious to the light of the second spectrum group but block the light of the first spectrum group, the first spectrum group and the second spectrum group not overlapping each other.

An embodiment of the present invention provides a three-dimensional display method for use in any one of the three-dimensional display apparatuses described above, the three-dimensional display method comprising: receiving left-eye image data and right-eye image data for displaying one frame of image; and controlling a display device to emit light of a first spectrum group or light of a second spectrum group, to display a left-eye image and a right-eye image according to design requirement.

BRIEF DESCRIPTION OF THE DRAWINGS

In order to clearly illustrate the technical solution of the embodiments of the present invention, the drawings of the embodiments will be briefly described in the following; it is obvious that the described drawings are only related to some embodiments of the present invention and thus are not limitative of the present invention.

DESCRIPTION OF THE EMBODIMENTS

Figure 1:
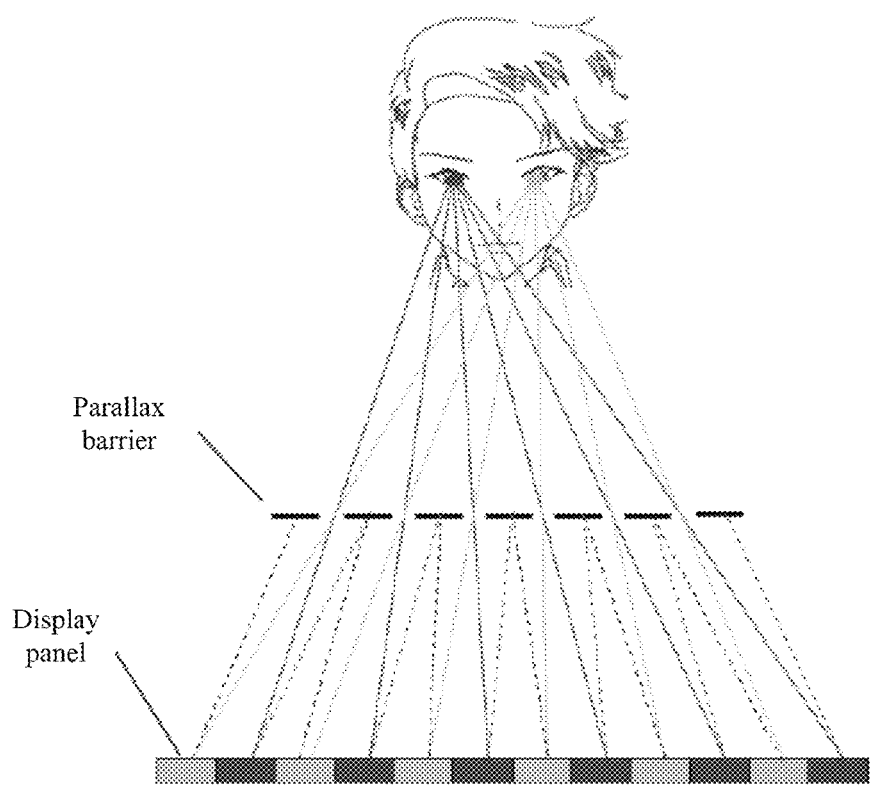
FIG. 1 is a structural diagram of a conventional parallax-barrier type naked-eye three-dimensional display apparatus.

In order to make objects, technical details and advantages of the embodiments of the present invention apparent, the technical solutions of the embodiment will be described in a clearly and fully understandable way in connection with the drawings related to the embodiments of the present invention. It is obvious that the described embodiments are just a part but not all of the embodiments of the present invention. Based on the described embodiments herein, those skilled in the art can obtain other embodiment(s), without any inventive work, which should be within the scope of the present invention.

Unless otherwise specified, the technical terms or scientific terms here should be of general meaning as understood by those ordinarily skilled in the art. In the disclosure, words such as "first", "second" and the like do not denote any order, quantity, or importance, but rather are used for distinguishing different components. Similarly, words such as "one", "a/an" or "the" or the like do not denote quantitative limitation, but rather indicate there is at least one. Words such as "include" or "comprise" and the like denote that elements or objects appearing before the words of "include" or "comprise" cover the elements or the objects enumerated after the words of "include" or "comprise" or equivalents thereof, not exclusive of other elements or objects. Words such as "connected" or "connecting" and the like are not limited to physical or mechanical connections, but may include electrical connection, either direct or indirect. Words such as "up", "down", "left", "right" and the like are only used for expressing relative positional relationship, when the absolute position is described object is changed, the relative positional relationship may also be correspondingly changed.

The embodiments of the present invention provide a three-dimensional display apparatus and a three-dimensional display method for use in the three-dimensional display apparatus.

The three-dimensional display apparatus according to an embodiment of the present invention comprises: a display device, including a plurality of pixels arranged in an array and being capable of emitting light of a first spectrum group and light of a second spectrum group; a parallax barrier, including a plurality of first narrow band filters and a plurality of second narrow band filters arranged alternately, wherein the plurality of first narrow band filters transmit the light of the first spectrum group but block the light of the second spectrum group, and the plurality of second narrow band filters transmit the light of the second spectrum group but block the light of the first spectrum group, the first spectrum group and the second spectrum group not overlapping each other.

In the three-dimensional display apparatus, since the parallax barrier disposed on the light exiting side of the display device includes the plurality of first narrow band filters and the plurality of second narrow band filters arranged alternately, and the two types of narrow band filters transmit respectively the light of the first spectrum group and the light of second spectrum group, which do not overlap each other, for the first narrow band filters, two or more viewing points may be formed by the light of the second spectrum group, and for the second narrow band filters, two or more viewing points may be formed by the light of the first spectrum group, and thereby, as compared with the parallax barrier only made of one material, the number of the viewing points of the three-dimensional display apparatus is apparently increased, e.g., for a conventional two-viewing-points three-dimensional display apparatus, the three-dimensional display apparatus which uses the two types of narrow band filters according to the embodiment of the present invention can increase the number of viewing points up to four, so the three-dimensional display apparatus according to the embodiment of the present invention can increase the number of viewing points, so as to enhance freedom degree of stereoscopic viewing.

Hereinafter, the three-dimensional display apparatus and the three-dimensional display method for use in the three-dimensional display apparatus provided by the embodiments of the present invention will be described in detail in conjunction with the accompanying drawings.

Figure 2:
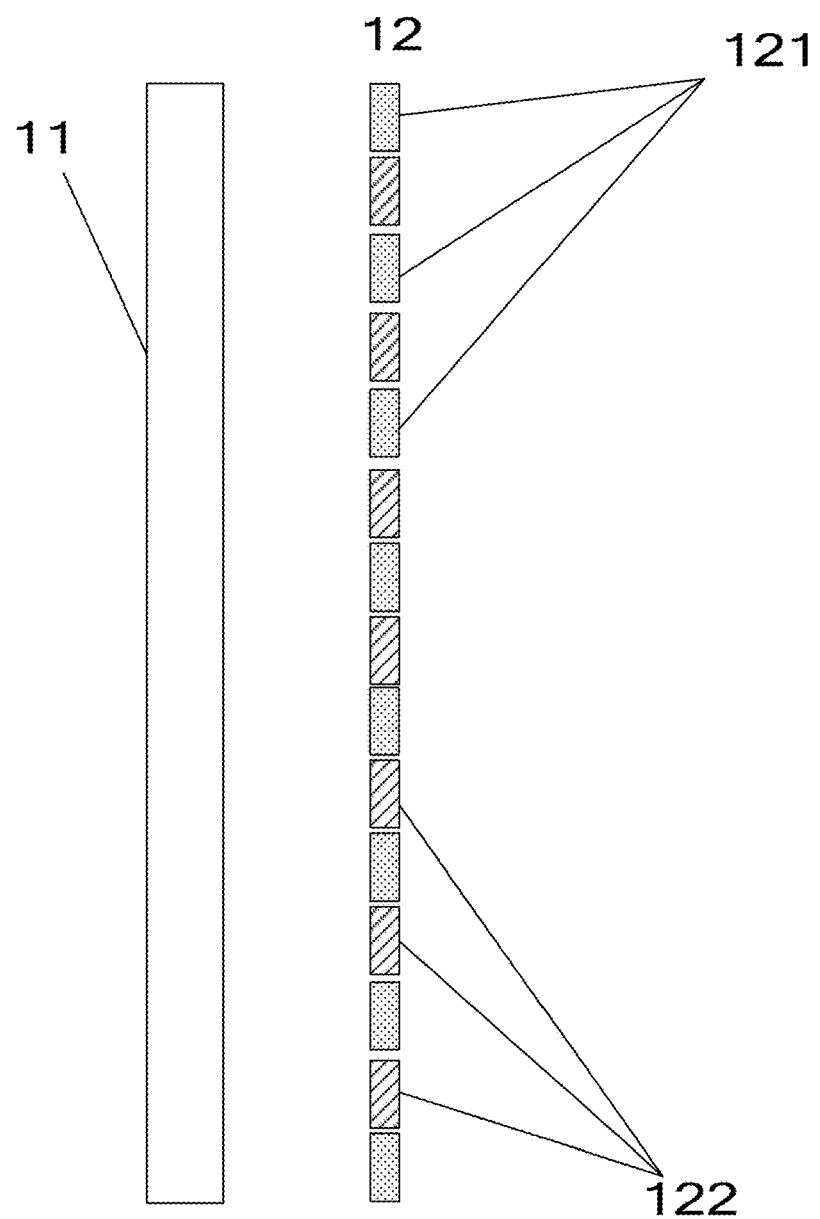
FIG. 2 is a structural schematic diagram of a three-dimensional display apparatus according to an embodiment of the present invention.

An embodiment of the present invention provides a three-dimensional display apparatus, and FIG. 2 shows a structural schematic diagram of the three-dimensional display apparatus. As shown in FIG. 2, a three-dimensional display apparatus 10 comprises: a display device 11, including a plurality of pixels arranged in an array and being capable of emitting light L1 of a first spectrum group and light L2 of a second spectrum group; a parallax barrier 12, including a plurality of first narrow band filters 121 and a plurality of second narrow band filters 122 arranged alternately, wherein the plurality of first narrow band filters 121 can transmit the light of the first spectrum group but block the light of the second spectrum group, and the plurality of second narrow band filters 122 can transmit the light of the second spectrum group but block the light of the first spectrum group; here the first spectrum group and the second spectrum group do not overlap to each other.

Exemplarily, since spectral ranges of the light to which the first narrow band filters and the second narrow band filters are pervious do not overlap, the light of the first spectrum group to which the first narrow band filters 121 are pervious will be blocked by the second narrow band filters 122, while the light of the second spectrum group to which the second narrow band filters 122 are pervious will be blocked by the first narrow band filters 121; for the light of the first spectrum group, the first narrow band filters 121 are transparent, and a formed 3D image is actually formed by light splitting of the second narrow band filters 122, while for the light of the second spectrum group, the second narrow band filters 122 are transparent, and a formed 3D image is actually formed by light splitting of the first narrow band filters 121, in this way, grating parameters of the first narrow band filters may be designed independently of grating parameters of the second narrow band filters, both of which do not interfere with each other.

Here, it should be noted that, since the first narrow band filters 121 and the second narrow band filters 122 may be designed independently of each other, there may be an interval or no interval between any two adjacent first narrow band filter 121 and second narrow band filter 122 according to design needs; however, the interval between the first narrow band filter and the second narrow band filter shown in FIG. 2 is merely an example, which does not limit the solution of the embodiment of the present invention.

Exemplarily, when there is an interval between the first narrow band filter 121 and the adjacent second narrow band filter 122, a completely opaque black matrix may be further disposed in the interval between the adjacent narrow band filters, for preventing light crosstalk, so as to further improve the 3D display effect.

Figure 3:
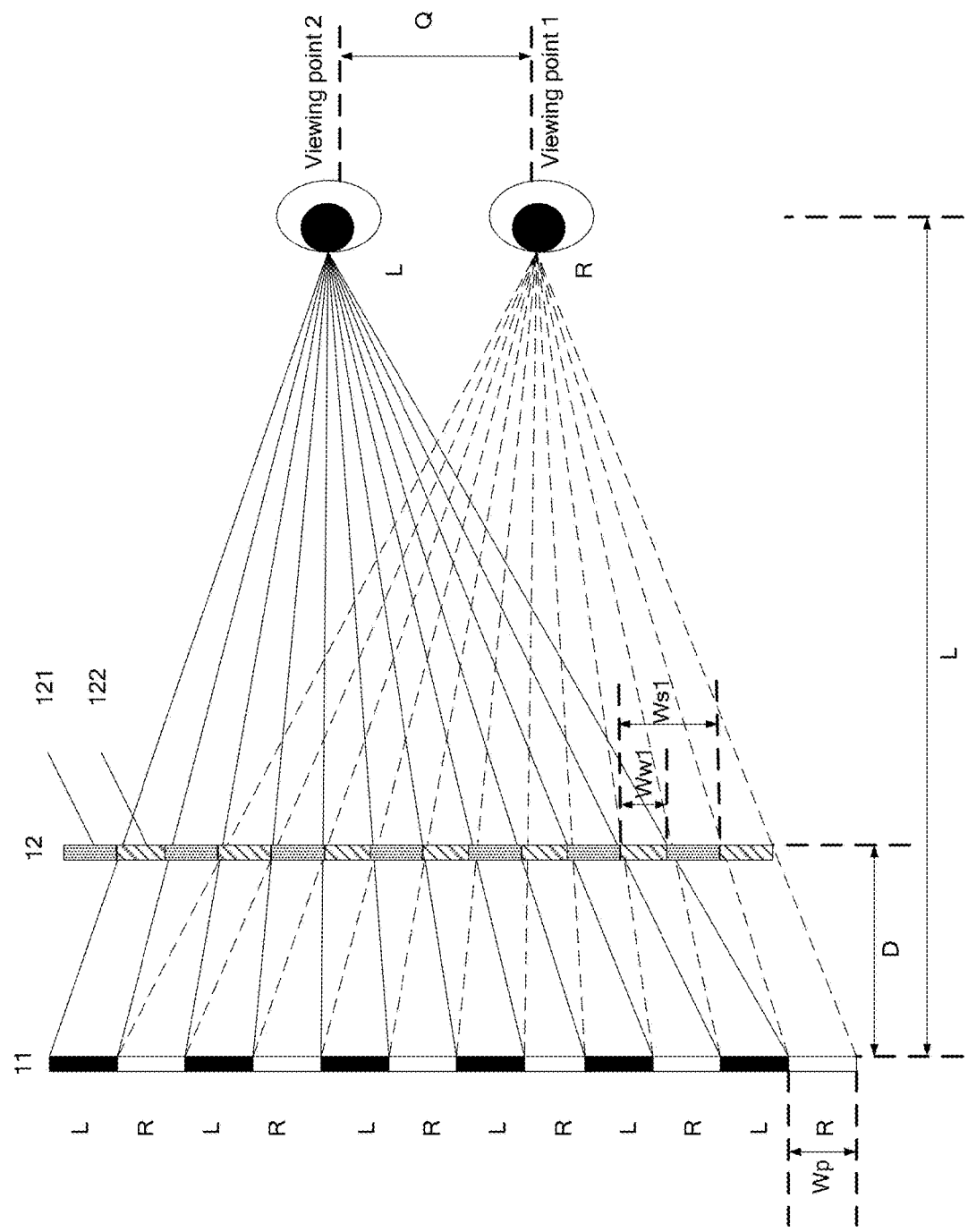
FIG. 3 is a light-splitting diagram of a first narrow band filter of a three-dimensional display apparatus according to an embodiment of the present invention.

With reference now to FIG. 3, grating parameters of the parallax barrier according to the embodiment of the present invention will be exemplarily illustrated with the design of the first narrow band filters as an example, and for brevity, FIG. 3 only shows a light-splitting diagram of the first narrow band filters.

As shown in FIG. 3, a grating formed by the first narrow band filters 121 has a pitch of Ws1, and a grating slit width, that is to say, an interval between the first narrow band filters 121 is Ww1, then the equations below may be obtained according to the triangle similarity principle:

$$Ww1 = \frac{Q \times Wp}{Q + Wp} \quad (1)$$

$$Ws1 = K \times \frac{Q \times Wp}{Q + Wp} \quad (2)$$

$$D = \frac{L \times Wp}{Q + Wp} \quad (3)$$

Where, D is a distance between the parallax barrier 12 and the display device 11, Wp is a width of one pixel of the display device 11, Q is a viewing point interval of adjacent parallax images, which is typically a distance between a left eye and a right eye of a person, K is the number of viewing points, L is an optimum viewing distance, in this way, the grating parameters of the first narrow band filters 121 can be calculated from the above equations, for example, the width of the first narrow band filter 121 and the interval between the first narrow band filters.

Likewise, the grating parameters of the second narrow band filters 122 may be obtained with reference to the first narrow band filters 121, which, for brevity, will not be repeated here.

In one example, the display device 11 of the three-dimensional display apparatus according to an embodiment of the present invention may include a backlight unit 111 and a display panel 112, so that the display device according to the embodiment of the present invention is capable of emitting the light of the first spectrum group and the light of second spectrum group, because the backlight unit can provide the above two types of light to the display panel for image display.

Here, it should be noted that the obtaining of the grating parameters of the first and the second narrow band filters is illustrated above with the parallax barrier being disposed on the light exiting side of the display device as an example, but the parallax barrier may also be located between the display panel and the backlight unit, that is, disposed on a light entering side of the display panel. Those skilled in the art may dispose the parallax barrier on the light entering side or the light exiting side of the display panel according to design needs, which will not be limited by the embodiment of the present invention; likewise, the grating parameters of the first and the second narrow band filters disposed on the light entering side of the display panel may be obtained with reference to the obtaining of the grating parameters of the first narrow band filters disposed on the light exiting side of the display panel.

Exemplarily, the backlight unit 111 includes a first light source 1111 and second light source 1112, the first light source 1111 being configured to emit the light L1 of the first spectrum group, and the second light source 1112 being configured to emit the light L2 of the second spectrum group; and the display panel 112 includes a plurality of pixels and receives the light emitted by the backlight unit 111 to display an image.

The first light source and the second light source of the backlight unit 111 may include a fluorescent lamp, a light emitting diode (LED), an arc lamp, a laser, or any other light source which can be configured to respectively output the light of the first spectrum group and the light of second spectrum group. In some examples, the backlight unit 111 may include light sources emitting red light, blue light or green light.

Further, an exemplary structure of a backlight unit is given as follows. The first light source 1111 of the backlight unit 111 may include a plurality of first solid-state lasers emitting light of different spectra, and the second light source 1112 may include a plurality of second solid-state lasers emitting light of different spectra; here the plurality of first solid-state lasers and the plurality of second solid-state lasers are juxtaposed, for example, disposed on a same side of a common substrate.

Figure 4:
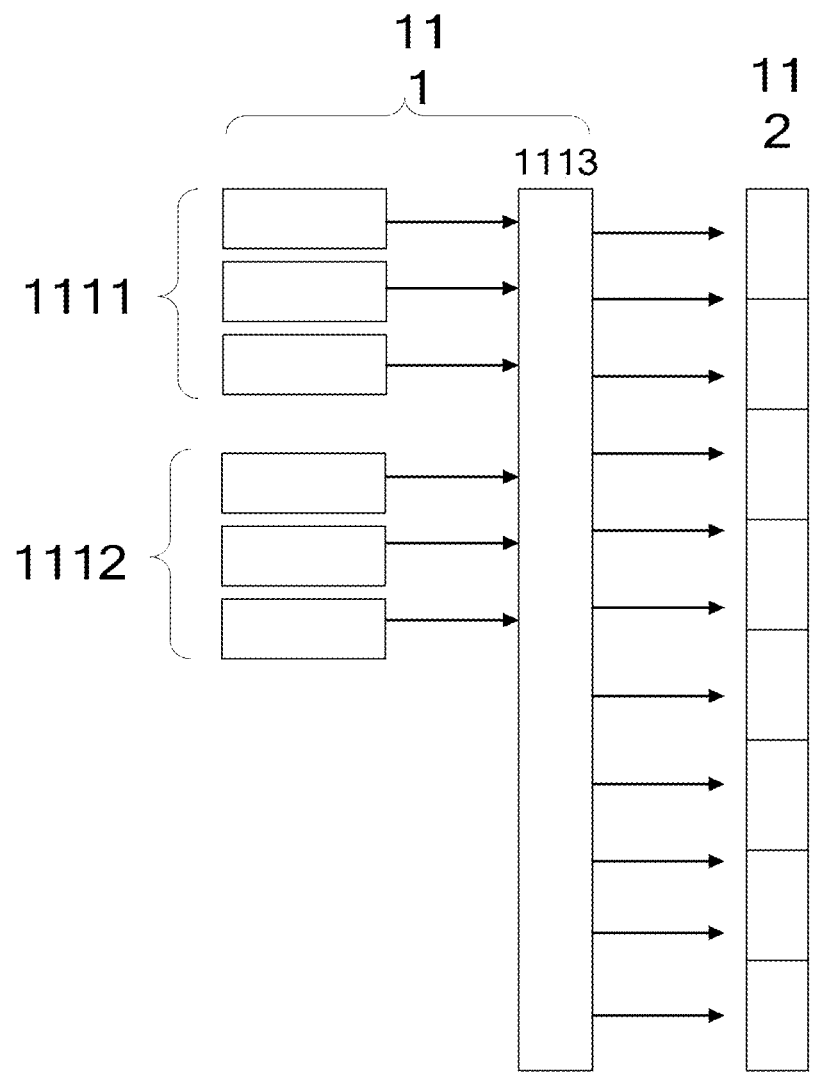
FIG. 4 is an exemplary structural diagram of a display device included by a three-dimensional display apparatus according to an embodiment of the present invention.

Exemplarily, as shown in FIG. 4, the backlight unit 111 may further include a light guide plate 1113, the light guide plate 1113 including a light entering surface and a light exiting surface, wherein the light entering surface faces the plurality of first solid-state lasers and the plurality of second solid-state lasers, for receiving light emitted from the plurality of first solid-state lasers and the plurality of second solid-state lasers, and the light exiting surface is used for guiding the light towards the display panel 112, so as to provide light to the display panel 112 for image display.

Further, the backlight unit 111 according to the embodiment of the present invention may further include a reflector 1114, disposed on a side of the light guide plate 1113 opposite to the display panel 112, for reflecting light going to the reflector 1114 back to the light guide plate 1113, so as to improve utilization ratio of the light.

Figure 5:
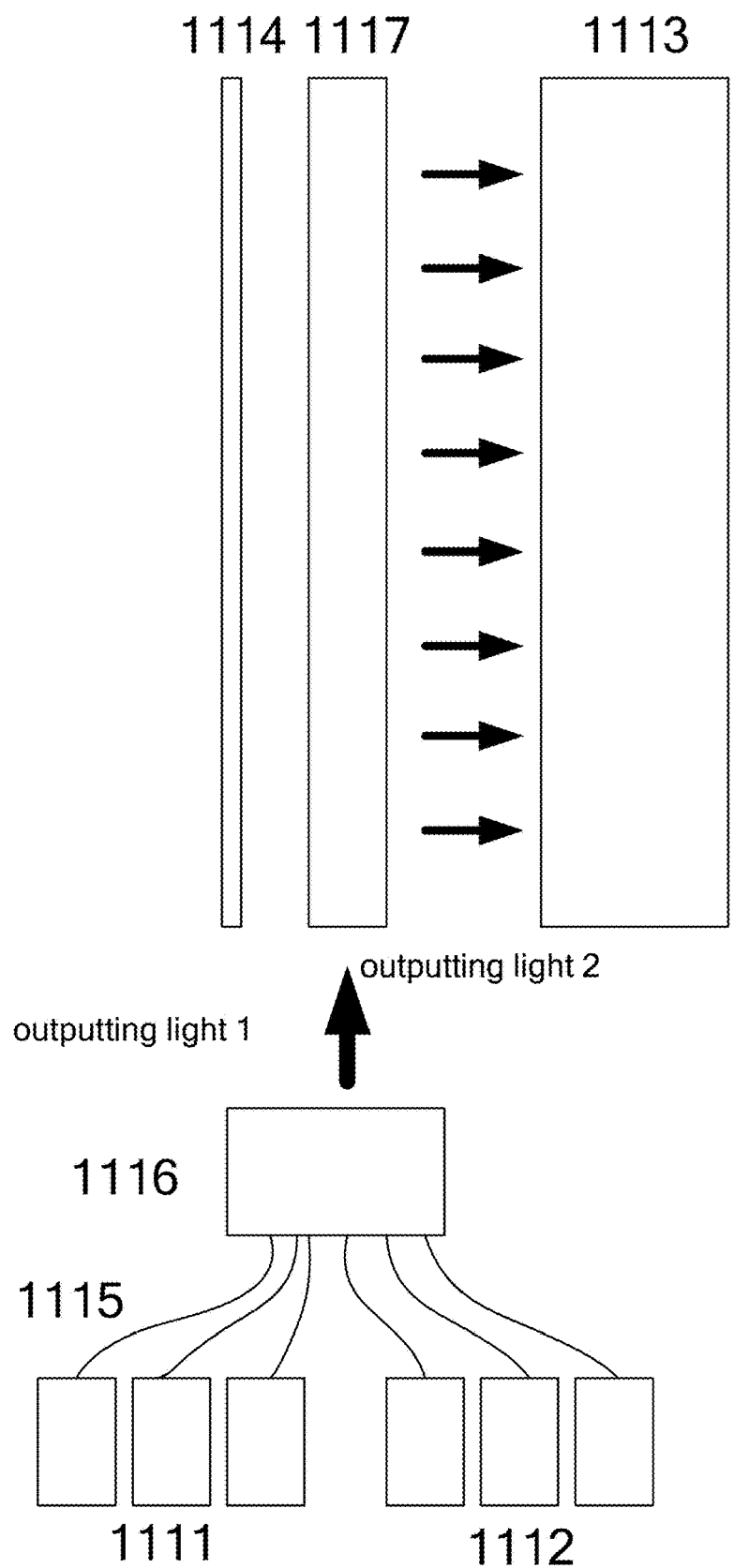
FIG. 5 is an exemplary structural diagram of a backlight unit of a three-dimensional display apparatus according to an embodiment of the present invention.

Further, as shown in FIG. 5, the backlight unit 111 may further include: a plurality of optical fibers 1115, with one end of each optical fiber respectively coupled to each solid-state laser; a wavelength division multiplexer 1116, the other end of each optical fiber being coupled to the wavelength division multiplexer 1116, and the wavelength division multiplexer 1116 being used for synthesizing light with a plurality paths from the optical fibers into light with one path to output, e.g., synthesizing as outputting light 1 to be emitted; a scattering rod 1117, disposed on the light exiting side of the wavelength division multiplexer 1116, for converting the outputting light 1 into a line light source, e.g., outputting light 2, so that the outputting light 2 emitted from the scattering rod 1117 may be used as the incident light of the light guide plate, and further, the reflector 1114 being provided on a side of the scattering rod 1117 opposite to the light guide plate, for reflecting the light reflected to the reflector back to the scattering rod 1117.

Figure 6:
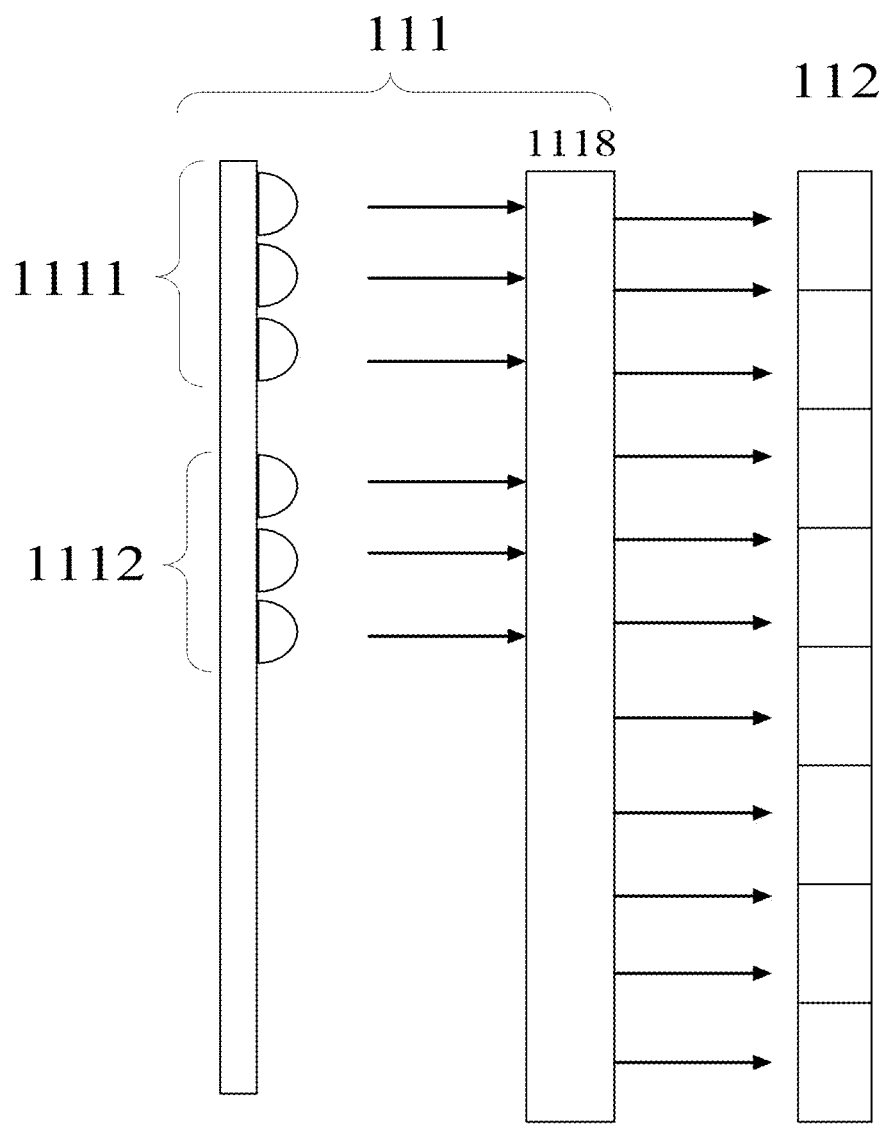
FIG. 6 is an exemplary structural diagram of another display device of a three-dimensional display apparatus according to an embodiment of the present invention.

Now, an exemplary structure of another type of backlight unit will be described, as shown in FIG. 6, the first light source 1111 of the backlight unit 111 may include a plurality of first light emitting diodes emitting light of different spectra, the second light source 1112 may include a plurality of second light emitting diodes emitting light of different spectra, wherein the plurality of first light emitting diodes and the plurality of second light emitting diodes are juxtaposed, e.g., juxtaposed on the same side of the substrate.

Further, the backlight unit 111 further includes a light guide plate 1118, the light guide plate 1118 including a light entering surface and a light exiting surface, wherein the light entering surface faces the plurality of first light emitting diodes and the plurality of second light emitting diodes, for receiving light emitted from the plurality of first light emitting diodes and the plurality of second light emitting diodes, and the light exiting surface is used for guiding the light towards the display panel 112, so as to provide the light to the display panel 112 for image display.

Exemplarily, the display panel 112 according to the embodiment of the present invention may be a liquid crystal display panel, including, an array substrate and a color filter substrate disposed opposite to each other; a liquid crystal layer, sandwiched between the array substrate and the color filter substrate, wherein the color filter substrate includes a filter layer, e.g., a red filter layer, a blue filter layer and a green filter layer, the filter layers of the three colors are capable to transmit red light of different spectrum groups, blue light of different spectrum groups, and green light of different spectrum groups, that is, respectively transmit the red light, the blue light and the green light with a broad spectral band.

In some examples, the display device 11 may be a self-luminous organic light emitting display device (OLED), so the light of the first spectrum group and the light of the second spectrum group emitted by the display device 11 are emitted by the pixels per se of the organic light emitting display device, which will be exemplarily illustrated as follows.

Here, the parallax barrier 12 may be disposed on the light exiting side of the organic light emitting display device, for splitting the light of a left-eye image and the light of a right-eye image.

Exemplarily, the organic light emitting display device may include a plurality of pixels, the plurality of pixels including a plurality of first pixels and a plurality of second pixels, wherein the plurality of first pixels are configured to emit the light of the first spectrum group, and the plurality of second pixels are configured to emit the light of the second spectrum group. Each of the plurality of pixels includes a thin film transistor and an organic light emitting device. Exemplarily, the organic light emitting device is a microcavity organic light emitting device, the microcavity organic light emitting device includes an anode/a cathode, an organic light emitting layer, a cathode/an anode and a Distributed Bragg Reflector (DBR) mirror sequentially disposed, wherein the thin film transistor is used for driving the organic light emitting device connected thereto to emit light, and here, the pixels emitting light with the different spectra depends on a cavity length of the microcavity. In addition, the microcavity organic light emitting device may further include: a hole injection layer, a hole transport layer, an electron injection layer, an electron transport layer, etc.

Exemplarily, the organic light emitting device included by each of the plurality of pixels of the organic light emitting display device may include an anode/a cathode, an organic light emitting layer, a cathode/an anode sequentially disposed, wherein the thin film transistor is used for driving the organic light emitting device connected thereto to emit light, and here, the pixels emitting the light of different spectra are applied different drive values.

Each of the plurality of first narrow band filters 121 and the plurality of second narrow band filters 122 may be a dichroic filter or a filter based on a retarder stack. Herein, the dichroic filter may include a glass substrate and multi-layer dielectric material layers sequentially coated on one side of the glass substrate, so that those skilled in the art may select a suitable dielectric material as required, so as to transmit the light of the first spectrum group but block the light of the second spectrum group, or transmit the light of the second spectrum group but block the light of the first spectrum group.

Exemplarily, the filter based on the retarder stack may include: a color selecting retarder stack, including N>=2 retardation films; an input polarizer, disposed on a light entering side of the color selecting retarder stack; and an output polarizer, disposed on a light exiting side of the color selecting retarder stack, where N is a natural number greater than or equal to 2; in this way, the first or the second narrow band filters formed can be pervious to the light of the first spectrum group but block the light of the second spectrum group, or be pervious to the light of the second spectrum group but block the light of the first spectrum group.

Figure 7:
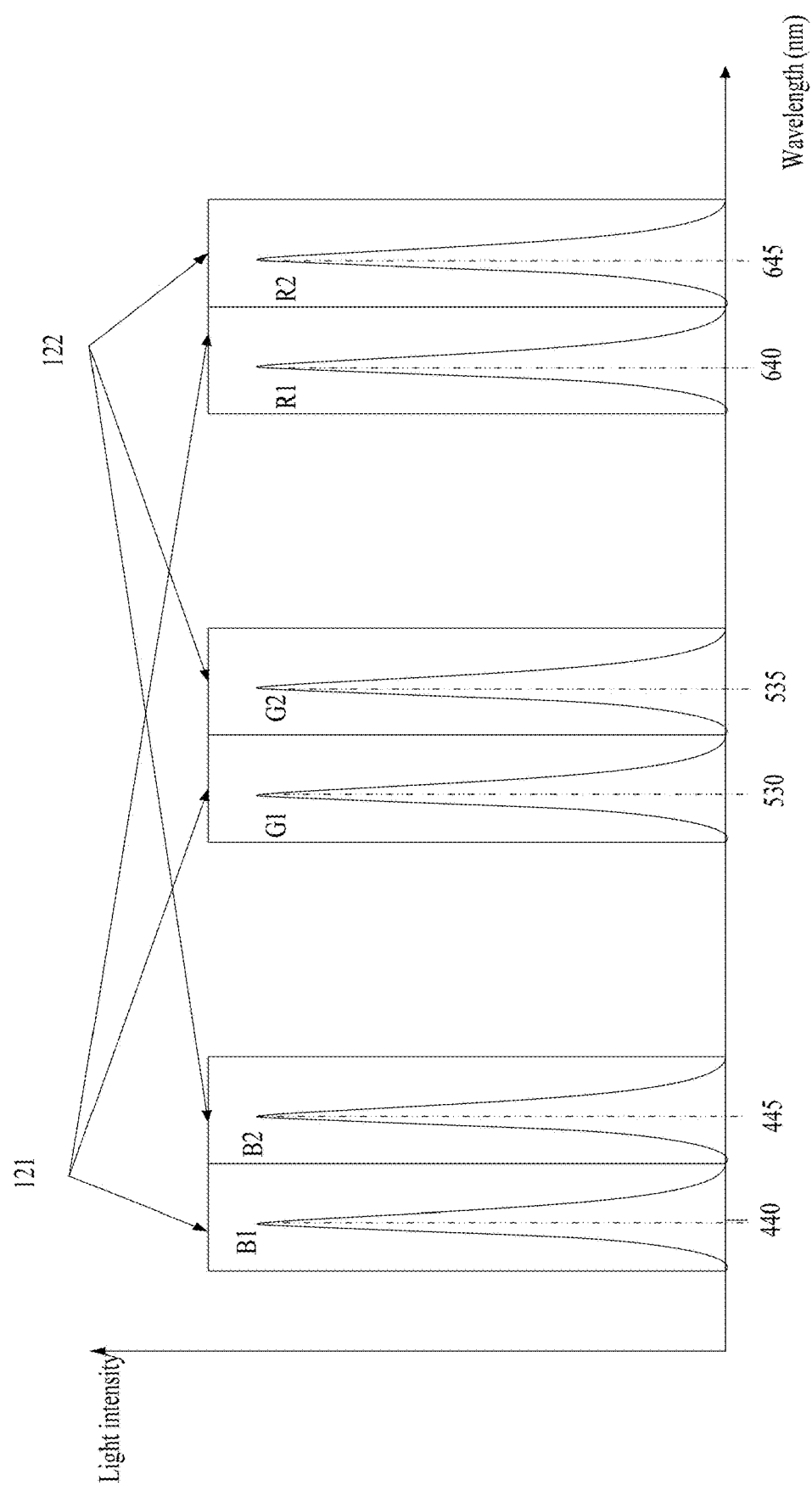
FIG. 7 exemplarily shows a spectrum chart of light of a first spectrum group or light of a second spectrum group according to an embodiment of the present invention.

Exemplarily, as shown in FIG. 7, the light of the first spectrum group may include three primary colors, i.e., a first red light R1, a first green light G1 and a first blue light B1; and the light of the second spectrum group may include three primary colors, i.e., a second red light R2, a second green light G2, and a second blue light B2, wherein spectra of the first red light R1 and the second red light R2 do not overlap, spectra of the first green light G1 and the second green light G2 do not overlap, spectra of the first blue light B1 and the second blue light B2 do not overlap, and a spectral interval between each pair is relatively small, so that the human's eye cannot see the difference between the two, and therefore, the 3D images respectively formed by the first narrow band filters and the second narrow band filters have no difference or little difference that can be ignored, and the images viewed by viewers respectively located in viewing zones formed by the first narrow band filters and the second narrow band filters do not differ substantially, so, although the 3D images are formed respectively by two spectrum groups which do not overlap each other, the three-dimensional stereoscopic display effect will not be affected.

Further, the light of the first spectrum group may also include other colors in addition to the first red light R1, the first green light G1 and the first blue light B1, e.g., a yellow light Y1, etc., so the light of the first spectrum group may include the first red light R1, the first green light G1, the first blue light B1 and the first yellow light Y1; correspondingly, the light of the second spectrum group may include light complementary to the light of the first spectrum group, that is, may include other colors in addition to the second red light R2, the second green light G2, and the second blue light B2, e.g., a second yellow light Y2, etc., so the light of the second spectrum group may include the second red light R2, the second green light G2, the second blue light B2, and the second yellow light Y2.

FIG. 7 exemplarily illustrates composition of the light of the first spectrum group and the light of the second spectrum group according to the embodiment of the present invention, for example, as shown in FIG. 7, the first blue light B1 may have a spectral peak of 440 nm, the second blue light B2 may have a spectral peak of 445 nm, the first green light G1 may have a spectral peak of 530 nm, the second green light G2 may have a spectral peak of 535 nm, the first red light R1 may have a spectral peak of 640 nm, and the second red light R2 may have a spectral peak of 645 nm.

Here, it should be noted that, FIG. 7 only gives an example of composition of the light of the first spectrum group and the light of the second spectrum group, those skilled in the art may select the red light, the blue light and the green light with other spectral peaks as required, and the above is not intended to limit the embodiments of the present invention, for example, the first blue light B1 may have a spectral peak of 466 nm, the second blue light B2 may have a spectral peak of 432 nm, the first green light G1 may have a spectral peak of 532 nm, the second green light G2 may have a spectral peak of 518 nm, the first red light R1 may have a spectral peak of 629 nm, and the second red light R2 may have a spectral peak of 615 nm.

Accordingly, corresponding to the composition of the first spectrum group and the second spectrum group described above, the first light source 111 included by the backlight unit 111 may include a red LED R1 emitting the first red light, a green LED G1 emitting the first green light, and a blue LED B1 emitting the first blue light, or include a red solid-state laser emitting the first red light, a green solid-state laser emitting the first green light, and a blue solid-state laser emitting the first blue light; the second light source 112 may include a red LED R2 emitting the second red light, a green LED G2 emitting the second green light and a blue LED B2 emitting the second blue light, or include a red solid-state laser emitting the second red light, a green solid-state laser emitting the second green light, and a blue solid-state laser emitting the second blue light. Or, the first light source 111 may further include a yellow LED Y1 emitting the first yellow light; or may include a yellow solid-state laser emitting the first yellow light; the second light source 112 may further include a yellow LED Y2 emitting the second yellow light; or may further include a yellow solid-state laser emitting the second yellow light.

Further, correspondingly, in a case where the display device 11 is an organic light emitting display device, the plurality of first pixels may be configured to include red pixels PR1 emitting the first red light, green pixels PG1 emitting the first green light and blue pixels PB1 emitting the first blue light respectively; the plurality of second pixels may be configured to include red pixels PR2 emitting the second red light, green pixels PG2 emitting the second green light and blue pixels PB2 emitting the second blue light respectively; or the plurality of first pixels may further include yellow pixels PY1 emitting the first yellow light, and the plurality of second pixels may include yellow pixels PY2 emitting the second yellow light.

In one example, the display device in the three-dimensional display apparatus provided by the embodiment of the present invention may emit the light of the first spectrum group or the light of the second spectrum group in a time-sequential manner. Exemplarily, the display device 11 emits the light of the first spectrum group in a first time period t1 of a display period t of each frame of image, and the display device 11 emits the light of the second spectrum group in a remaining second time period t2 of the display period, wherein t=t1+t2. Here, t1 and t2 may be predefined in a display program or may be set by the viewer according to actual situations, as long as the viewer can view the correct 3D image respectively through the first narrow band filters and the second narrow band filters.

Thus, when there are viewers in both viewing zone formed by the first narrow band filters and viewing zone formed by the second narrow band filters, all these viewers can see the 3D image.

In some examples, the three-dimensional display apparatus provided by the embodiment of the present invention may further comprise: a controller 18, the controller 18 being configured to control the display device 11 to emit the light of the first spectrum group or the light of the second spectrum group, and the controller 18 can control the display device 11 to emit the light of the first spectrum group or the light of the second spectrum group according to a control signal input by an operator.

Figure 8:
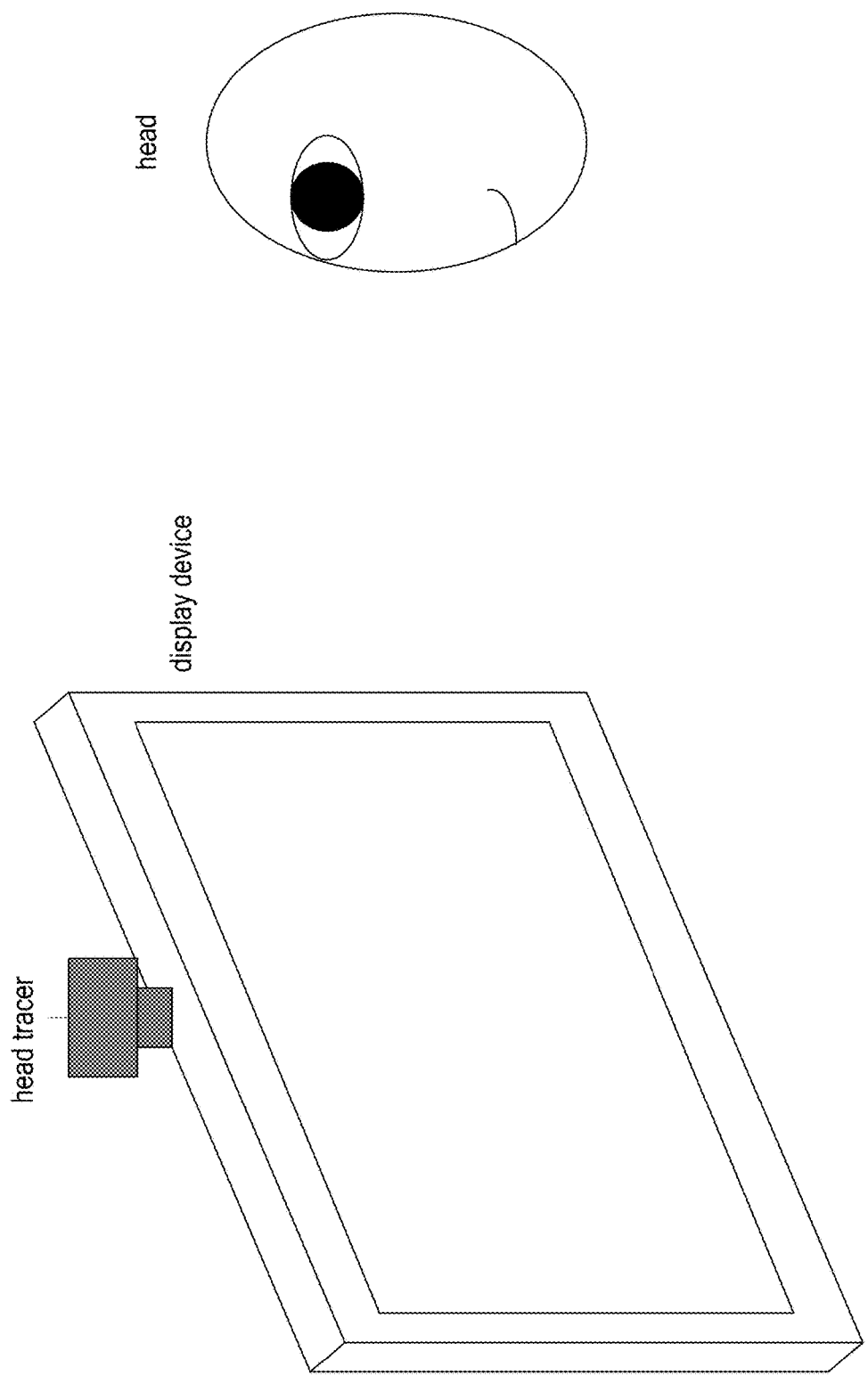
FIG. 8 is an exemplary structural diagram of a three-dimensional display apparatus according to an embodiment of the present invention.

In some examples, as shown in FIG. 8, the three-dimensional display apparatus according to the embodiment of the present invention may further comprise: a head tracer 19, configured to detect a position of a viewer's head, properly speaking, for detecting a position of the viewer's eyes, so that the display device can emit the light of the first spectrum group or the light of the second spectrum group in accordance with the position of the viewer's eyes. For example, when the head tracer 19 detects that the viewer is in a viewing zone formed by the first narrow band filters 121, the display device emits the light of the second spectrum group, and when the head tracer 19 detects that the viewer is in a viewing zone formed by the second narrow band filters 122, the display device emits the light of the first spectrum group.

Exemplarily, the head tracer 19 may include: an imaging unit 191, configured to capture an image of the viewer's head; and a determining unit 192, for determining a position of the head according to the image captured by the imaging unit 191.

Figure 9:
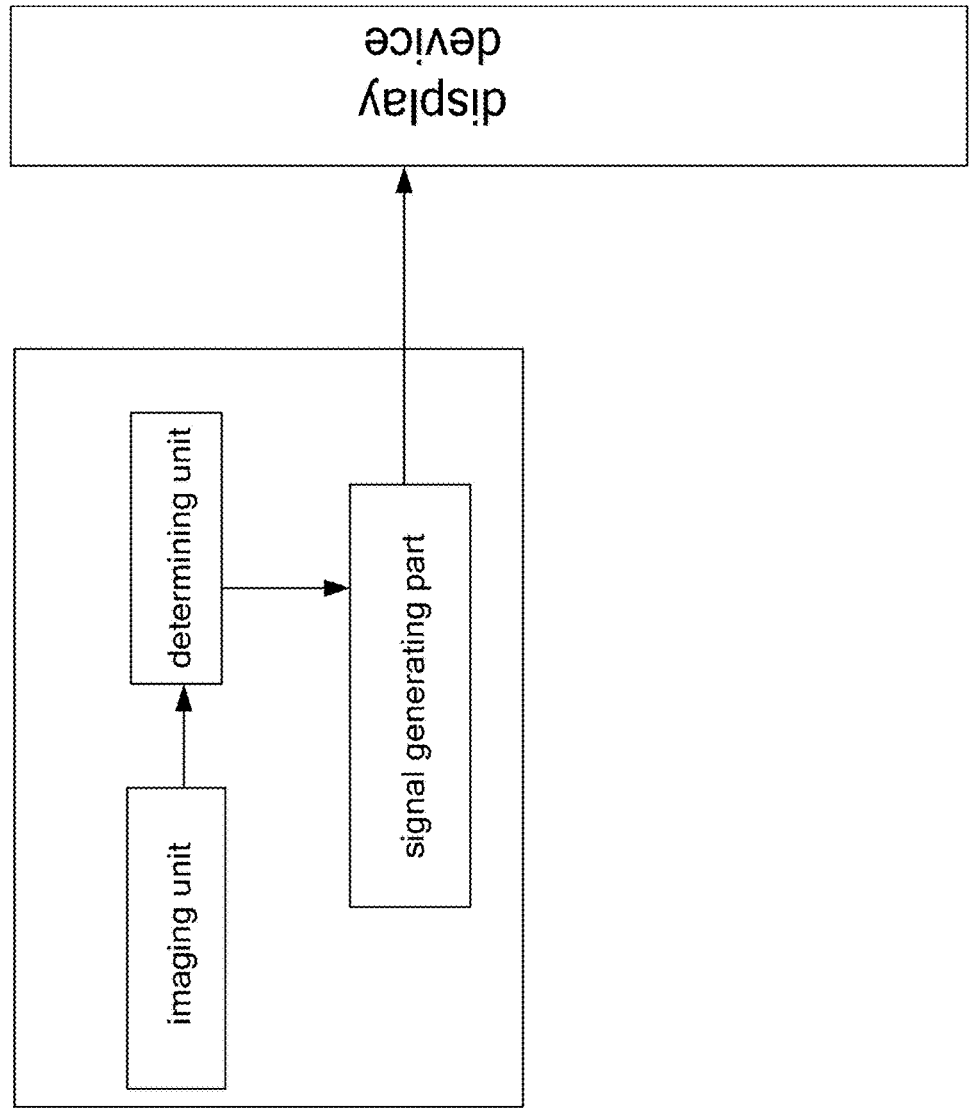
FIG. 9 is an exemplary structural block diagram of another three-dimensional display apparatus according to an embodiment of the present invention.

Further, as shown in FIG. 9, the head tracer 19 may further include: a signal generating part 193, for outputting a control signal according to the position of the viewer's head obtained by the determining unit 192, to control the display device 11 to emit the light of the first spectrum group or the light of the second spectrum group.

Figure 10:
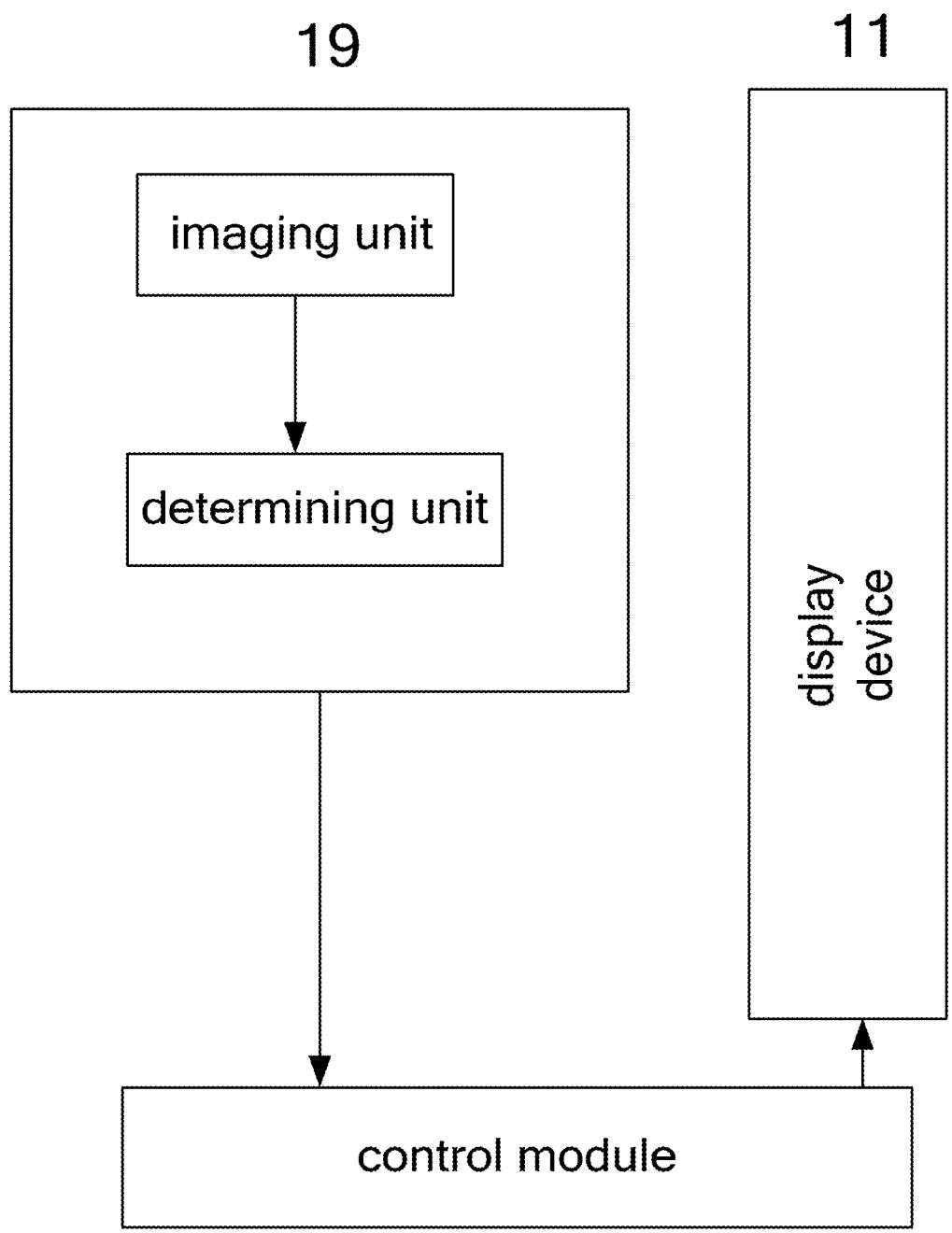
FIG. 10 is an exemplary structural block diagram of still another three-dimensional display apparatus according to an embodiment of the present invention.

In some examples, as shown in FIG. 10, the three-dimensional display apparatus provided by the embodiment of the present invention may further comprise a control module 20, the control module 20 being configured to receive the position of the viewer's head detected by the head tracer 19 and output the control signal according to the position of the viewer's head detected by the head tracer 19, to control the display device to emit the light of the first spectrum group or the light of the second spectrum group. For example, the control module 20 receives the position of the head obtained by the determining unit 192 and outputs the control signal accordingly.

Further, for the three-dimensional display apparatus already produced, various parameters are determined, e.g., a width and a pitch of each of the first narrow band filters 121 and the second narrow band filters 122, and positions and ranges of viewing zones of the two types of narrow band filters can be obtained thereby, as a result, the positions and the ranges of the viewing zones may be known in advance, the determining unit 192 of the head tracer 19 may determine whether the view's head is located in a first position, e.g., the viewing zone formed by the first narrow band filters 121, or in a second position, e.g., the viewing zone formed by the second narrow band filters 122, according to positions and the ranges of the viewing zones already known. Here, only an example is given, for example, the head tracer may obtain the positions and the ranges of the viewing zones of the two types of narrow band filters by simulating, and then determine the position of the head, which will not be limited by the embodiment of the present invention, as long as the position can be determined.

In addition, it should be noted by those skilled in the art that, the viewing zones for viewing an image formed by the first narrow band filters 121 and the second narrow band filters 122 may overlap; if the viewer is located in an overlapped region, at this time, it may be determined that the head is located in the first position or the second position, so as to control the display device to emit the light of the first spectrum group or the light of the second spectrum group, and actually, the images viewed in the two types of viewing zones have no difference or have little difference.

Here, it should be noted by those skilled in the art that, in "the first narrow band filters transmit (are pervious to) the light of the first spectrum group but block the light of the second spectrum group" as described in the embodiments of the present invention, the expression "being pervious to (transmit)" does not only mean that the light of the first spectrum group can completely be transmitted, but also means that no less than 90% of the light of the first spectrum group can be transmitted, and the expression "block" means that more than 90% of the light of the second spectrum group is blocked, that is, there may be a case where 0%-10% of the light of the second spectrum group is transmitted, which is also applicable to the second narrow band filters, and will not be repeated here. In addition, for "the first spectrum group and the second spectrum group do not overlap", it does not mean that they do not overlap 100%, while they may overlap slightly, e.g., overlap 0% to 5%, which, however, does not affect the effect of the embodiment of the present invention.

Figure 11:
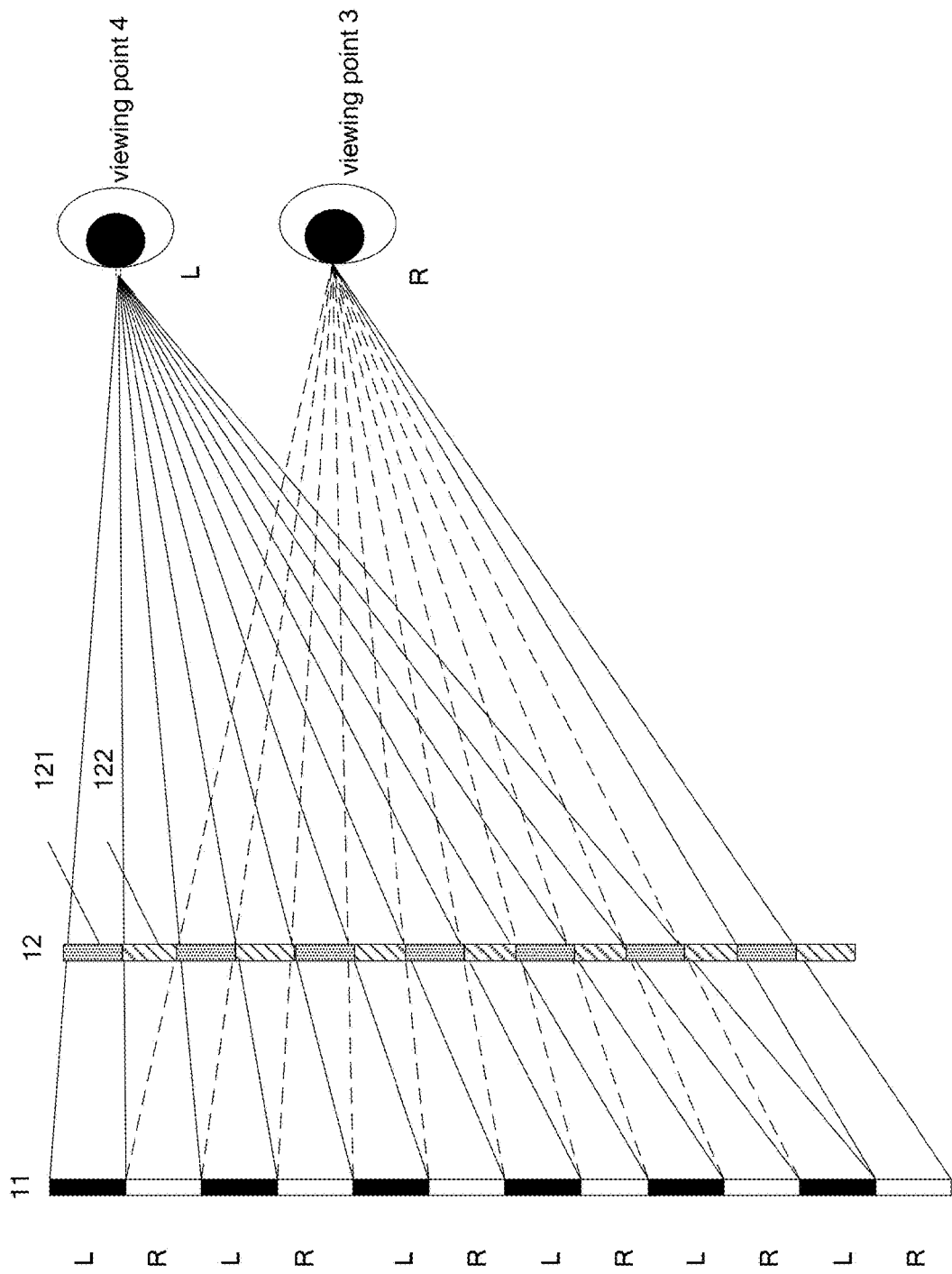
FIG. 11 is a light-splitting diagram of a second narrow band filter of a three-dimensional display apparatus according to an embodiment of the present invention.

In the three-dimensional display apparatus according to an embodiment of the present invention, since the parallax barrier includes the plurality of first narrow band filters and the plurality of second narrow band filters arranged alternately, which are respectively pervious to the light of the first spectrum group and the light of second spectrum group which do not overlap each other, for the first narrow band filters, two or more viewing points may be formed by using the light of the second spectrum group, and for the second narrow band filters, two or more viewing points may be formed by using the light of the first spectrum group. Thereby, as compared with the parallax barrier only made of one material, the number of the viewing points of the three-dimensional display apparatus is apparently increased, e.g., for a conventional two-viewing-point three-dimensional display apparatus, FIG. 3 shows viewing points 1 and 2 formed by the first narrow band filters 121, FIG. 11 shows other viewing points 3 and 4 formed by the second first narrow band filters 122, so that the three-dimensional display apparatus which uses the two types of narrow band filters according to the embodiment of the present invention can increase the number of viewing points up to four, so the three-dimensional display apparatus according to the embodiment of the present invention can increase the number of viewing points, so as to enhance freedom degree of stereoscopic viewing.

An embodiment of the present invention further provides a three-dimensional display method for use in any of the above three-dimensional display apparatuses, the above embodiments may be referred to for a structure of the three-dimensional display apparatus, which, for brevity, will not be repeated here. The three-dimensional display method for use in the three-dimensional display apparatus will be illustrated emphatically as follows.

The three-dimensional display method according to an embodiment of the present invention comprises steps of:

S1: receiving left-eye image data and right-eye image data for displaying one frame of image; and S2: controlling a display device to emit light of a first spectrum group or light of a second spectrum group, to display a left-eye image and a right-eye image according to design requirement.

Exemplarily, the step S2 may include:

S21: controlling the display device to emit the light of the first spectrum group in a first time period t1 of a display period t of each frame of image, so as to display the left-eye image and the right-eye image; and S22: controlling the display device to emit the light of the second spectrum group in a second time period t2 of the display period t of each frame of image, so as to display the left-eye image and the right-eye image.

Thus, when there are viewers in a viewing zone formed by the first narrow band filters and a viewing zone formed by the second narrow band filters at the same time, all the viewers in these viewing zones can see the corresponding 3D image, so that the stereoscopic viewing effect of the three-dimensional display device will not be affected.

Exemplarily, the step S2 may include:

S31: adopting a controller to output a control signal, to control the display device to emit the light of the first spectrum group to display the left-eye image and the right-eye image or to emit the light of the second spectrum group to display the left-eye image and the right-eye image.

Exemplarily, the step S31 may include:

Detecting a position of a viewer's head;

When the viewer's head is in a first position, outputting a control signal by the controller to control the display device to emit the light of the first spectrum group, and when the viewer's head is in a second position, outputting a control signal by the controller to emit the light of the second spectrum group.

Here, exemplarily, the first position refers to the viewing zone formed by the second narrow band filters 122, and the second position refers to the viewing zone formed by the first narrow band filters 121.

Thus, the three-dimensional display apparatus according to the embodiment of the present invention may control the display device to emit the light of the first spectrum group or the light of the second spectrum group, according to a position where the viewer is located, so that the viewers can see the 3D images whether they are located in the viewing zone formed by the first narrow band filters or in the viewing zone formed by the second narrow band filters, so that stereoscopic visual sense of the viewers can be enhanced.

Exemplarily, the step S31 may include:

Outputting a control signal by the controller according to an input of an operator to control the display device to emit the light of the first spectrum group or to emit the light of the second spectrum group.

Thus, the three-dimensional display apparatus according to the embodiment of the present invention may control the display device to emit the light of the first spectrum group or the light of the second spectrum group, according to the operation of the operator, so as to enhance the stereoscopic visual sense of the viewers.

Thus, for the three-dimensional display method according to an embodiment of the present invention for use in any of the above-described three-dimensional display apparatuses, the display device may be controlled in a time-sequential manner to emit the light of the first spectrum group or the light of the second spectrum group, or the display device may emit the light of the first spectrum group or the light of the second spectrum group according to the position of the viewer's head, or the display device may emit the light of the first spectrum group or the light of the second spectrum group according to the control of the operator; in this way, by enabling the display device to emit the light of the first spectrum group and the light of the second spectrum group, and setting the first and the second narrow band filters respectively pervious to the light of the first spectrum group and the light of the second spectrum group, a viewer located outside the viewing zone of the first narrow band filters and located inside the viewing zone of the second narrow band filters can view the same 3D stereoscopic image without moving, so that the number of the viewing points of the three-dimensional display apparatus can be increased, the probability to view a pseudo stereoscopic image or a pseudoscopic image is reduced, and the freedom degree of stereoscopic viewing is enhanced.

The above are only specific embodiments of the present application, but the scope of the embodiment of the present invention is not limited thereto, and any skilled in the art, within the technical scope disclosed by the embodiment of the present invention, can easily think of variations or replacements, which should be covered within the protection scope of the embodiment of the present invention.

What is claimed is:

1. A three-dimensional display apparatus, comprising:
a display device, including a plurality of pixels arranged in an array and being capable of emitting light of a first spectrum group and light of a second spectrum group;
a parallax barrier, including a plurality of first narrow band filters and a plurality of second narrow band filters arranged alternately, wherein an interval is provided between each first narrow band filter of the plurality of first narrow band filters and each second narrow band filter of the plurality of second narrow band filters adjacent to each other, and a black matrix is disposed in each of the intervals between each adjacent first and second narrow band filters,
wherein the plurality of first narrow band filters are pervious to the light of the first spectrum group but block the light of the second spectrum group, and the plurality of second narrow band filters are pervious to the light of the second spectrum group but block the light of the first spectrum group, the first spectrum group and the second spectrum group not overlapping each other,
wherein in one time period, the three-dimensional display apparatus only emits the light of the first spectrum group or the light of the second spectrum group,
wherein the light of the first spectrum group is configured to be utilized to simultaneously display a left eye image and a right eye image which constitute a three-dimensional image, the light of the second spectrum group is configured to be utilized to simultaneously display another left eye image and another right eye image which constitute another three-dimensional image,
wherein a viewing point region toward which the light of the first spectrum group emits after exiting from the three-dimensional display apparatus is different from a viewing point region toward which the light of the second spectrum group emits after exiting from the three-dimensional display apparatus, so that viewers positioned in different viewing point regions will see different three-dimensional images which are made respectively by the light of the first spectrum group and the light of the second spectrum group; and
a backlight unit, including a first light source and a second light source, the first light source being configured to emit the light of the first spectrum group, and the second light source being configured to emit the light of the second spectrum group, the first light source and the second light source are different from each other, the different three-dimensional images which are seen by different viewers which are positioned in different viewing point regions are respectively formed by light emitted from the first light source and the second light source different from each other, a three-dimensional image seen by a viewer in one viewing point region is formed only by light emitted from one of the first light source and the second light source, and a three-dimensional image seen by a viewer in another viewing point region is formed only by another of the first light source and the second light source.

2. The three-dimensional display apparatus according to claim 1, wherein the display device further comprises:
a display panel, including the plurality of pixels and receiving light emitted by the backlight unit to display an image.

3. The three-dimensional display apparatus according to claim 2, wherein the first light source includes a plurality of first solid-state lasers emitting light of different spectra, the second light source includes a plurality of second solid-state lasers emitting light of different spectra, and the plurality of first solid-state lasers and the plurality of second solid-state lasers are juxtaposed.

4. The three-dimensional display apparatus according to claim 2, wherein the first light source includes a plurality of first light emitting diodes emitting light of different spectra, and the second light source includes a plurality of second light emitting diodes emitting light of different spectra, the plurality of first light emitting diodes and the plurality of second light emitting diodes are juxtaposed.

5. The three-dimensional display apparatus according to claim 1, wherein the display device is an organic light emitting display device, and the plurality of pixels include a plurality of first pixels and a plurality of second pixels, wherein the plurality of first pixels emit the light of the first spectrum group, and the plurality of second pixels emit the light of the second spectrum group.

6. The three-dimensional display apparatus according to claim 1, wherein each of the plurality of first narrow band filters and the plurality of second narrow band filters is a dichroic filter.

7. The three-dimensional display apparatus according to claim 1, wherein each of the plurality of first narrow band filters and the plurality of second narrow band filters includes:
a color selecting retarder stack, including $N>=2$ retardation films;
an input polarizer, disposed on a light entering side of the color selecting retarder stack; and
an output polarizer, disposed on a light exiting side of the color selecting retarder stack.

8. The three-dimensional display apparatus according to claim 1, further comprising: a controller, configured to control the display device to emit the light of the first spectrum group or the light of the second spectrum group.

9. The three-dimensional display apparatus according to claim 8, wherein the controller is configured to control the display device to emit the light of the first spectrum group or the light of the second spectrum group according to a control signal input by an operator.

10. The three-dimensional display apparatus according to claim 1, further comprising: a head tracer, configured to detect a position of a viewer's head.

11. The three-dimensional display apparatus according to claim 10, wherein the head tracer comprises:
an imaging unit, configured to capture an image of the viewer's head; and
a determining unit, configured to determine a position of the viewer's head according to the image captured by the imaging unit.

12. The three-dimensional display apparatus according to claim 10, wherein the head tracer further includes: a signal generating part, configured to output a control signal according to the position of the viewer's head detected by the head tracer, to control the display device to emit the light of the first spectrum group or the light of the second spectrum group.

13. The three-dimensional display apparatus according to claim 10, further comprising:
a control module, configured to receive the position of the viewer's head detected by the head tracer and output a control signal, to control the display device to emit the light of the first spectrum group or the light of the second spectrum group.

14. The three-dimensional display apparatus according to claim 1, wherein the display device emits the light of the first spectrum group in a first time period of a display period of each frame of image, and emits the light of the second spectrum group in a second time period of the display period of each frame of image.

15. A three-dimensional display method for use in the three-dimensional display apparatus according to claim 1, the three-dimensional display method comprising:
   receiving left-eye image data and right-eye image data for displaying one frame of image; and
   controlling the display device to emit light of the first spectrum group or light of the second spectrum group to display a left-eye image and a right-eye image according to a design requirement.

16. The three-dimensional display method according to claim 15, wherein the controlling the display device to emit light of the first spectrum group or light of the second spectrum group to display the left-eye image and the right-eye image according to the design requirement, comprises:
   controlling the display device to emit the light of the first spectrum group in a first time period of a display period of each frame of image, and
   controlling the display device to emit the light of the second spectrum group in a second time period of the display period of each frame of image.

17. The three-dimensional display method according to claim 15, wherein the controlling the display device to emit light of the first spectrum group or light of the second spectrum group to display the left-eye image and the right-eye image according to the design requirement, comprises:
   adopting a controller to output a control signal, to control the display device to emit the light of the first spectrum group to display the left-eye image and the right-eye image or to emit the light of the second spectrum group to display the left-eye image and the right-eye image.

18. The three-dimensional display method according to claim 17, wherein the adopting the controller to output the control signal, to control the display device to emit the light of the first spectrum group or to emit the light of the second spectrum group, comprises:
   detecting a position of a viewer's head; and
   when the viewer's head is in a first position, outputting the control signal by the controller to control the display device to emit the light of the first spectrum group, and when the viewer's head is in a second position, outputting the control signal by the controller to emit the light of the second spectrum group.

19. The three-dimensional display method according to claim 17, wherein the adopting the controller to output the control signal, to control the display device to emit the light of the first spectrum group or to emit the light of the second spectrum group, comprises:
   outputting the control signal by the controller according to an input of an operator to control the display device to emit the light of the first spectrum group or to emit the light of the second spectrum group.

* * * * *